No. 799,934. PATENTED SEPT. 19, 1905.
C. PAHDE.
PROCESS FOR ELECTRICALLY WELDING RAIL JOINTS.
APPLICATION FILED JUNE 30, 1904.
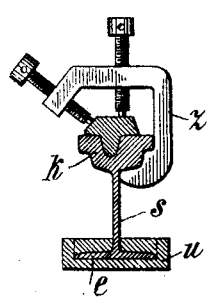
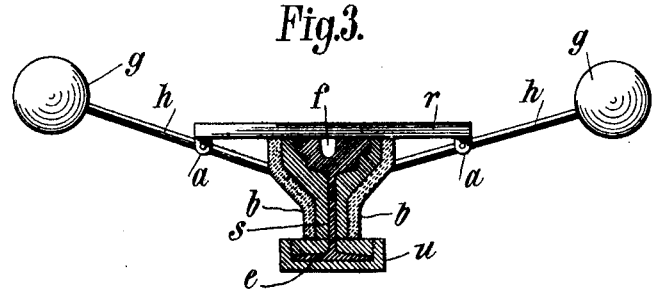
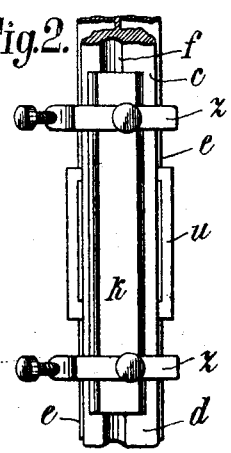
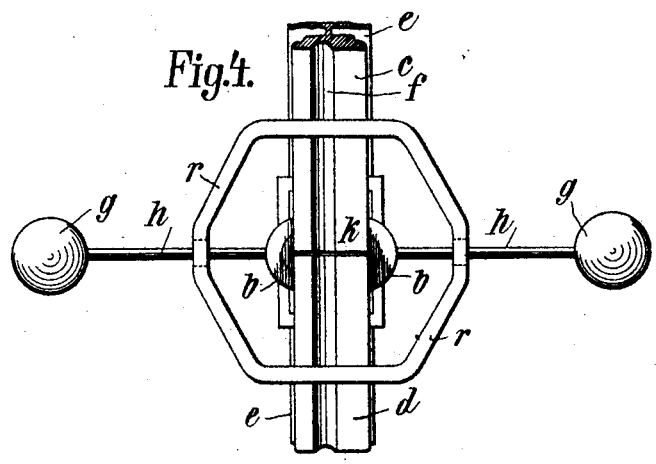
WITNESSES:
W. M. Avery
Walton Harrison
INVENTOR
Carl Pahde
BY
ATTORNEYS.

UNITED STATES PATENT OFFICE.

CARL PAHDE, OF BRESLAU, GERMANY.

PROCESS FOR ELECTRICALLY WELDING RAIL-JOINTS.

No. 799,934.   Specification of Letters Patent.   Patented Sept. 19, 1905.

Application filed June 30, 1904. Serial No. 214,738.

*To all whom it may concern:*

Be it known that I, CARL PAHDE, a subject of the German Emperor, residing at Hohenzollernstrasse 63/65 Breslau, Germany, have invented a new and Improved Process for Electrically Welding Rail-Joints, of which the following is a specification.

The present invention relates to an electric process for welding, and has for its object to weld rail-joints—that is, the rail ends abutting against one another. This can be successfully performed according to the present invention by proceeding in the manner about to be described.

The apparatus employed in carrying the present process into effect may of course vary, and while practical apparatus for carrying out the steps as hereinafter described are shown in the drawings attached to this specification it is to be understood that such particular illustration is by way of illustration and not limitation.

Referring to the sheet of drawings, Figure 1 is a transverse section of a rail, showing means for holding the rails in position and a form for the rail-foot to be described. Fig. 2 is a plan of the rail ends, also showing in plan the apparatus shown in Fig. 1. Fig. 3 is a transverse section through the rail-joint, showing means for enabling the rail-heads to be welded together. Fig. 4 is a plan of the arrangement shown in Fig. 3.

According to the present process, in the first place the rail ends *c d* are brought into the right position with regard to one another by means of screw-cramps *z*, whereupon a form *u* is placed round the rail-foot *e*, which is freely exposed at this place. The rails are then connected with the one pole of a source of direct current, the other pole of which is connected in a well-known manner with an arc-lamp carbon. The rail-foot is then lightly touched with the carbon and an arc is struck. By means of the arc the feet *e e* of both rail ends *c d* are completely melted. This can be effected by one carbon first of all on one side or by means of two carbons by two workmen on both sides of the rails. By adding pieces of iron of suitable composition the melted metal is increased until the same fills the form *u* completely or for the greater part. This form *u* may consist of fire-brick or the like; but it is more advantageous to make it of iron and to melt it also by means of the arc at its inner surface. It is then rigidly connected with the rail-foot after the welding and increases the strength of the weld. After the rail-foot is welded, melted, or fused together in this manner the screw-cramp *z* is unscrewed, as the position of the rail ends with regard to one another cannot alter any more, and two cheeks *b b*, Figs. 3 and 4, of refractory or other material surrounding the unwelded joint are applied and held in a suitable manner. This may suitably be effected, for example, by means of a frame *r*, on which two levers *h*, revoluble upon the pivots *a*, are arranged. The one end of each of these levers *h* is placed against the corresponding cheek *b*, whereas the other end of each lever is pressed downward by a weight *g*, so that these levers *h* hold the cheeks *b* fast. The rail-head *k* is now melted at the place where the joint occurs in the same manner as that in which the rail-foot was melted to such an extent that the rail-web *s* can be reached by the carbon, and pieces of iron and the like are added until the opening which has arisen is entirely filled with molten iron. If tramway-rails are to be welded, which possess a groove *f* in the rail-head, near the end of the operation a rod of refractory material, such as fire-brick or the like, is laid in this groove in order that the corresponding part of the rail-joint may not be filled up. If the cheeks are of iron, they likewise can be melted onto the rails.

The pieces of iron which are added may consist substantially of pig-iron of the first melting; but other kinds of iron may be employed—for instance, ferrosilicon, ferrowolfram, ferrochrome, ferronickel, and so on—in order to obtain any desired degree of hardness.

In order to prevent bubbles or porous places arising in the melted iron, which even though the work be carefully performed cannot be avoided and which impair the strength of such a welded joint, it is requisite to work by hammering the rail-joint immediately after the welding as long as it is red-hot. By so doing the material is compressed or consolidated and rendered perfectly homogeneous. Further, the hardness of the rail is increased at the welded place, so that the durability of the joint is materially increased. It is, moreover, advantageous to undertake the welding step by step and to hammer the layer of material melted each time after cooling and then to continue the welding. Finally, it has proved itself to be of advantage to give the welded place not the same degree of hardness in all parts.

If, for instance, the welded place is produced throughout with soft iron, it will be more quickly worn away by the carriage-wheels than the rail-head of the rest of the rails. If it is hard throughout, it can later when in use come apart again very easily. In order to also simultaneously avoid this defect, it is therefore advantageous to proceed in the following manner: First of all, soft iron having only a small percentage of carbon is placed in the joint and the joint is welded with this to nearly under the upper part of the rail-head. For welding together the latter upper part (about one to two centimeters) iron having a large percentage of carbon, or nickel, or manganese, or any other fairly hard metal, or a mixture of the same, is added, so that after cooling the upper part of the rail-head consists of hard metal, which does not easily wear away.

What I claim is—

1. The process herein described of welding rail-joints, which consists in temporarily securing the ends of the rails by placing a form around the rail-foot, melting said rail-foot by means of an electric current, adding pieces of soft iron until the junction between the ends of the rails at the foot thereof is filled up, surrounding the upper part of the rail with a second iron form having a shape differing from that of said first iron form, melting the upper parts of the rail thus inclosed by means of an electric current, and filling up the joint by the addition of pieces of hard iron, substantially as described.

2. The process herein described of welding rail-joints, which consists in disposing about the lower ends of the rails a form having a shape fitting the contour of the rail ends, melting the lower portions of said rail ends by means of an electric current, gradually adding pieces of metal as the rail ends are melted until the joint between the lower parts is filled up, then surrounding the upper parts of the adjacent ends with a molding-form, melting said upper parts by means of an electric current, and gradually filling the space between the upper parts by the addition of metal pieces until the joint is built up flush with the upper surface of the rails.

3. The process herein described of welding rail-joints, which consists in securing the ends of the rails, placing about said ends iron molding-forms having proper shape to fit the contour of the rails, melting parts of the rails and of the forms by means of an electric current, and gradually adding metal, piece by piece, to the molten mass thus formed until the joint is completely filled.

In testimony whereof I have signed my name to this specification in the presence of two subscribing witnesses.

CARL PAHDE.

Witnesses:
FRANK KATZ,
ALBERT SCHENK.